US006366449B1

(12) United States Patent
Hashizawa et al.
(10) Patent No.: US 6,366,449 B1
(45) Date of Patent: Apr. 2, 2002

(54) POWER SUPPLY SHUT-OFF APPARATUS

(75) Inventors: Shigemi Hashizawa; Hidehiko Kuboshima, both of Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/558,039

(22) Filed: Apr. 26, 2000

(30) Foreign Application Priority Data

May 6, 1999 (JP) .......................................... 11-126348

(51) Int. Cl.$^{7}$ ............................ H02B 1/18; H02B 1/26; H01H 85/20

(52) U.S. Cl. ....................... 361/642; 361/626; 361/646; 337/194

(58) Field of Search ................................ 361/104, 626, 361/642, 646, 833, 835, 837; 357/1, 4, 5, 9, 142, 186, 194, 208; 307/112, 116, 125, 130, 131, 149; 315/88, 93, 129, 130, 136; 340/500, 522, 540, 635, 652, 657, 638, 639, 660

(56) References Cited

U.S. PATENT DOCUMENTS

| | | | | | |
|---|---|---|---|---|---|
| 1,966,716 | A | * | 7/1934 | Green | 200/114 |
| 2,186,813 | A | * | 1/1940 | Adam et al. | 200/114 |
| 2,289,122 | A | * | 7/1942 | Jackson et al. | 200/114 |
| 2,636,096 | A | * | 4/1953 | Di Blasi | 200/115.5 |
| 3,030,474 | A | * | 4/1962 | Scott, Jr. | 200/133 |
| 3,202,788 | A | * | 8/1965 | George | 200/133 |
| 3,358,100 | A | * | 12/1967 | Schleicher | 200/114 |
| 3,379,842 | A | * | 4/1968 | Downs et al. | 200/114 |
| 3,775,727 | A | * | 11/1973 | Wise | 339/14 R |
| 3,840,781 | A | * | 10/1974 | Brown | 317/16 |
| 4,283,100 | A | * | 8/1981 | Griffin et al. | 339/19 |
| 4,500,862 | A | * | 2/1985 | Shedd | 337/32 |
| 4,767,359 | A | * | 8/1988 | Martell | 439/535 |
| 4,871,924 | A | * | 10/1989 | Sellati | 307/86 |
| 5,906,508 | A | * | 5/1999 | Jeffcoat | 439/509 |
| 5,973,418 | A | * | 10/1999 | Ciesielka et al. | 307/130 |
| 5,993,225 | A | * | 11/1999 | Johnson et al. | 439/136 |

FOREIGN PATENT DOCUMENTS

| | | | | |
|---|---|---|---|---|
| EP | 0411216 A1 * | 2/1991 | 439/101 |
| JP | 9-204856 | 8/1997 | |
| JP | 9-223439 | 8/1997 | |
| JP | 9-265874 | 10/1997 | |
| JP | 10-144429 | 5/1998 | |
| JP | 11-176507 A * | 7/1999 | H01R/13/44 |

OTHER PUBLICATIONS

HA–Anatoly Vortman–28.*

* cited by examiner

*Primary Examiner*—Leo P. Picard
*Assistant Examiner*—Anatoly Vortman
(74) *Attorney, Agent, or Firm*—Finnegan, Henderson, Farabow, Garrett & Dunner, L.L.P.

(57) ABSTRACT

A power supply shut-off apparatus includes a service plug 2 detachably mounted to a plug mounting portion 14 provided in an apparatus body 1, and the power supply-side switches between a conduction state and a nonconduction state between a load-side bus bar 3 and a power supply-side bus bar 4. When the plug housing 40 is mounted to the plug mounting portion 14 and the tilting lever 41 is tilted down substantially horizontally in a state where the tilting lever 41 of the service plug 2 is held in the substantially vertical state, the shaft 49 provided on the tilting lever 41 falls the movable lever 32 of the microswitch 15 so as to allow the microswitch 15 to detect the conduction state between the load-side bus bar 3 and the power supply-side bus bar 4.

5 Claims, 16 Drawing Sheets

POWER SUPPLY SHUT-OFF APPARATUS

BACKGROUND OF THE INVENTION

1. Field of the Invention

The present invention relates to a power supply shut-off apparatus for electrically interrupting the connection between a power supply and a load, and more particularly, to a small and space-saving power supply shut-off apparatus in which a fitting-detection ability is enhanced, the number of parts is small and cost-reduction can be realized.

2. Description of the Related Art

For example, in the case of an electric car, since a capacity of a power supply which is a battery is great as compared with that of a gasoline engine car, for maintenance of its electrical system, a power supply shut-off apparatus is provided for ensuring safety of operation.

As such a power supply shut-off apparatus, one as disclosed in Japanese Patent Application Laid-open No.H9-265874 is known for example. As shown in FIGS. 1 and 2, this power supply shut-off apparatus comprises a shut-off apparatus body 501, and a service plug 502 which is detachable and attachable with respect to the shut-off apparatus body 501.

As shown in FIG. 1, the shut-off apparatus body 501 includes a lower casing 503 and an upper casing 504 mounted on an upper end of the lower casing 503. Accommodated in the lower casing 503 are a pair of stationary electrodes 505, 506, a fuse 507, a terminal hardware 509 of a power supply-side wire 508 connected to the one stationary electrode 505, a terminal hardware 512 of a load-side wire 511 connected to one terminal 510 of the fuse 507, and a bus bar 514 for connecting the other terminal 513 of the fuse 507 and the other stationary electrode 506.

As shown in FIG. 1, the stationary electrodes 505 and 506 are threadedly engaged with and vertically rising from female screw members 515, 515 formed by insert molding such as to be embedded in the lower casing 503 at a predetermined distance from each other. The upper casing 503 is formed with circular holes 516, 516 at locations corresponding to the stationary electrodes 505, 506, and the stationary electrodes 505, 506 faces the circular holes 516, 516.

As shown in FIGS. 1 and 2, the service plug 502 comprises a movable electrode 518 having a pair of louver terminals 517, 517 mounted to the pair of stationary electrodes 505, 506 through the circular holes 516, 516, a handle mounting body 519 for mounting the movable electrode 518, a handle 521 supported such that the handle 521 can turn around a turning-movement supporting shaft 520 with respect to the handle mounting body 519, a spring member 522 provided between the handle 521 and the handle mounting body 519 for holding the handle 521 using toggle effect between a state where the handle 521 rises vertically and a state where the handle 521 lies horizontally, and magnets 524, 524 provided in the handle 521 and opposed to lead switch 523 provided on the upper casing 504 when the handle 521 is tilted down horizontally.

In the power supply shut-off apparatus constituted in the above manner, as shown in FIG. 1, if the pair of louver terminals 517, 517 are inserted into the circular holes 516, 516 formed in the upper casing 504 and are fitted to the stationary electrodes 505, 506 in a state where the handle 521 vertically stands up, the terminal hardware 509 of the power supply-side wire 508 and the terminal hardware 512 of the load-side wire 511 are electrically connected while the fuse 507 is arranged in series.

Then, the handle 521 is horizontally tilted down as shown in FIG. 2. With this, the magnets 524 provided in he handle 512 are disposed such as to be opposed to the lead switch 523, the conductive state between the terminal hardware 509 of the power supply-side wire 508 and the terminal hardware 512 of the load-side wire 511 is detected, and the detection result is transmitted to a computer.

According to the power supply shut-off apparatus constituted in this manner, by forming the service plug 502 such that it can be attached to and detached from the shut-off apparatus body 501, the terminal hardware 509 of the power supply-side wire 508 and the terminal hardware 512 of the load-side wire 511 can easily be electrically connected or disconnected. Therefore, the operation safety at the time of maintenance of the electrical system in an electric car for example can be ensured.

However, in the power supply shut-off apparatus of the above structure, the number of parts constituting the shut-off apparatus body 501 and a service plug 502 is great, the apparatus itself is increased in size, and an installation space must be ensured sufficiently. Especially, the structure of the service plug 502 is complicated, and this is disadvantageous in terms of the cost.

Further, in the above power supply shut-off apparatus, when the service plug 502 is mounted to the shut-off apparatus body 501, since it is necessary to insert and fit the louver terminals 517, 517 into the circular holes 516, 516 formed in the upper casing 504, this mounting operation of the service plug 502 is not easy. Especially when the power supply shut-off apparatus is mounted to a place where an operator can not easily to see, the mounting operation of the service plug 502 to the shut-off apparatus body 501 becomes more difficult.

SUMMARY OF THE INVENTION

It is an object of the present invention to provide a small and space-saving power supply shut-off apparatus in which a fitting-detection ability is enhanced, the number of parts is small and cost-reduction.

To achieve the above object, a power supply shut-off apparatus of the present invention comprises: an apparatus body including, bus bar mounting portions for respectively mounting one bus bar and another bus bar, a fuse mounting portion for mounting a fuse having one fuse terminal connected to a terminal of the one bus bar and having another fuse terminal connected to a one side edge terminal of an intermediate bus bar, a plug mounting portion which accommodates a terminal holding member in which a terminal of the other bus bar and the other side edge terminal of the intermediate bus bar are disposed on the opposite sides with respect to an insulation wall, and which is formed of a partition wall surrounding an outer periphery of the terminal holding member, and a conduction detecting means mounting portion for mounting conduction detecting means which detects a conduction state in which the one bus bar and the other bus bar are in conduction through the fuse and a nonconduction state therebetween; and a service plug including, a plug housing having a terminal member which is detachably mounted to the plug mounting portion and which is mounted astride the terminal holding member to come contact with the terminal of the other bus bar and to come contact with the terminal of the other side edge of the intermediate bus bar, thereby bringing the one bus bar and the other bus bar into conduction, and a service plug comprising a tilting lever which is tiltable between a substantially vertical state and a substantially horizontal state with respect to the plug housing; wherein when the plug housing is mounted to the plug mounting portion and the tilting lever is tilted down substantially horizontally in a state where the tilting lever of the service plug is held in the substantially vertical state, a projection provided on the tilting lever falls a movable lever of the conduction detecting means so as to allow the conduction detecting means to detect the conduction state between the one bus bar and the other bus bar.

In this manner, the terminal holding member in which a terminal of the other bus bar and the other side edge terminal of the intermediate bus bar are disposed on the opposite sides of an insulation wall is provided in the plug mounting portion which mounts the service plug to the apparatus is body, the plug housing having a terminal member which is mounted astride the terminal holding member and which comes into contact with the terminal of the other bus bar and the other side edge terminal of the other bus bar to bring the one bus bar and the other bus bar into conduction is mounted to the plug mounting portion. Therefore, the terminal holding member serves as a guide, and even if the power supply shut-off apparatus is disposed in a place where the operation is difficult, the service plug can easily be mounted.

Further, since the tilting lever is tiltably mounted to the plug housing, when the service plug is mounted to or removed from the plug mounting portion, the plug can easily be mounted by holding the tilting lever.

Further, when the plug housing is mounted to the plug mounting portion and the tilting lever is tilted down substantially horizontally in a state where the tilting lever of the service plug is held in the substantially vertical state, the projection provided on the tilting lever falls the movable lever of the conduction detecting means so as to allow the microswitch to detect the conduction state between the one bus bar and the other bus bar. Therefore, even if the plug housing is fitted to the plug mounting portion and the one bus bar and the other bus bar are brought into conduction, this conduction state is not detected by the microswitch unless the tilting lever is tilted horizontally to fall the movable lever. Thus, after the one bus bar and the other bus bar are brought into conduction, it is possible for an operator to allow the microswitch to detect the conduction state with a time lag intentionally, and it is possible to avoid an influence of remaining current.

Further, in the power supply shut-off apparatus of the present invention, the terminal holding member is formed with a pick-up slanting surface for mounting the terminal member.

Since the terminal holding member is formed with the pick-up slanting surfaces and, the terminal member provided on the plug housing is guided by the terminal holding member and smoothly mounted, which makes it easy to mount the service plug to the plug mounting portion.

Further, in the power supply shut-off apparatus of the present invention, the plug housing is provided with a projection which prevents the tilting lever from tilting to the horizontal direction by abutting the tilting lever against an inner surface of the partition wall of the plug mounting portion when the tilting lever is tilted to the horizontal direction in an incomplete mounting state in which the plug housing is not in contact with a tip end surface of the terminal holding member.

Since the tilting lever is designed such that it does not fall in the horizontal direction when the service plug is mounted incompletely, the mounting state of the service plug to the plug mounting portion can be judged instantaneously, and it is possible to avoid the incomplete mounting of the service plug.

Further, in the power supply shut-off apparatus of the present invention, the apparatus body is provided with an insulation cover for covering the fuse and the conduction detecting means, and the insulation cover is pushed by a cover pushing portion provided on the plug housing.

Therefore, the insulation cover can not be detached unless the service plug is detached from the plug mounting portion and thus, the safety can be ensured.

Further, in the power supply shut-off apparatus of the present invention, the conduction detecting means is a microswitch.

Since the microswitch is small in size and inexpensive, the mounting space can be small, and the power supply shut-off apparatus can be reduced in both size and cost.

BRIEF DESCRIPTION OF THE DRAWINGS

FIGS. 7A and 7B shows the apparatus body of the power supply shut-off apparatus of the embodiment, wherein FIG. 7A is a left side view, and FIG. 7B is a right side view;

FIGS. 11A and 11B shows the service plug of the power supply shut-off apparatus of the embodiment, wherein FIG. 11A is a front view, and FIG. 11B is a side view;

FIGS. 12A and 12B shows the service plug of the power supply shut-off apparatus of the embodiment, wherein FIG. 12A is a front view, and FIG. 12B is a cross sectional view taken along the line XIIB—XIIB in FIG. 11A;

FIGS. 13A and 13B shows the service plug of the power supply shut-off apparatus of the embodiment, wherein FIG. 13A is a front view in which an engaging projection of an arm is engaged with a plug-incomplete-mounting preventing projection, and FIG. 13B is a bottom view of the service plug;

FIG. 15A and 15B show a halfway state of mounting operation of the service plug to a plug mounting portion, wherein FIG. 15A is a cross sectional view showing a state where there exists a gap between a partition wall and a shaft tip end of the tilting lever, and FIG. 15B is a cross sectional view showing a state where the tilting lever is tilted and the shaft tip end comes into contact with the partition wall.

DETAILED DESCRIPTION OF THE PREFERRED EMBODIMENTS

Preferred embodiments of the present invention will be explained below in detail with reference to the drawings.

In the embodiments, the present invention is applied to a power supply shut-off apparatus which switches between conductive and nonconduction between a power supply (b)attery or the like) and a load (motor or the like) of an electric car. The embodiments enhance a fitting-detection ability, reduce the number of parts, reduce the size, saves the space and costs.

<Structure of the Power Supply Shut-off Apparatus>

Figure 1:
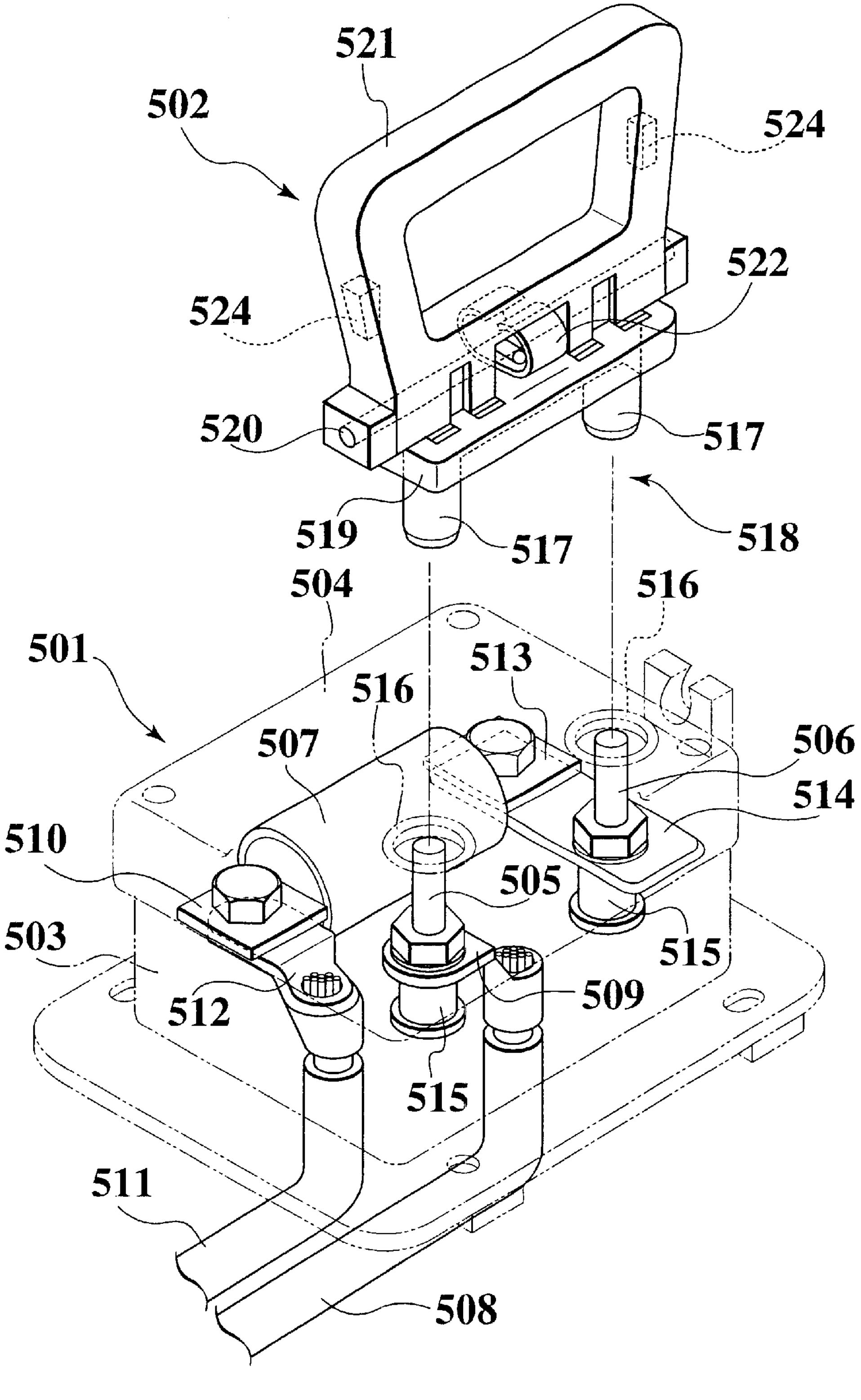
FIG.1 PRIOR ART
FIG. 1 is an exploded perspective view of a conventional power supply shut-off apparatus.
Figure 2:
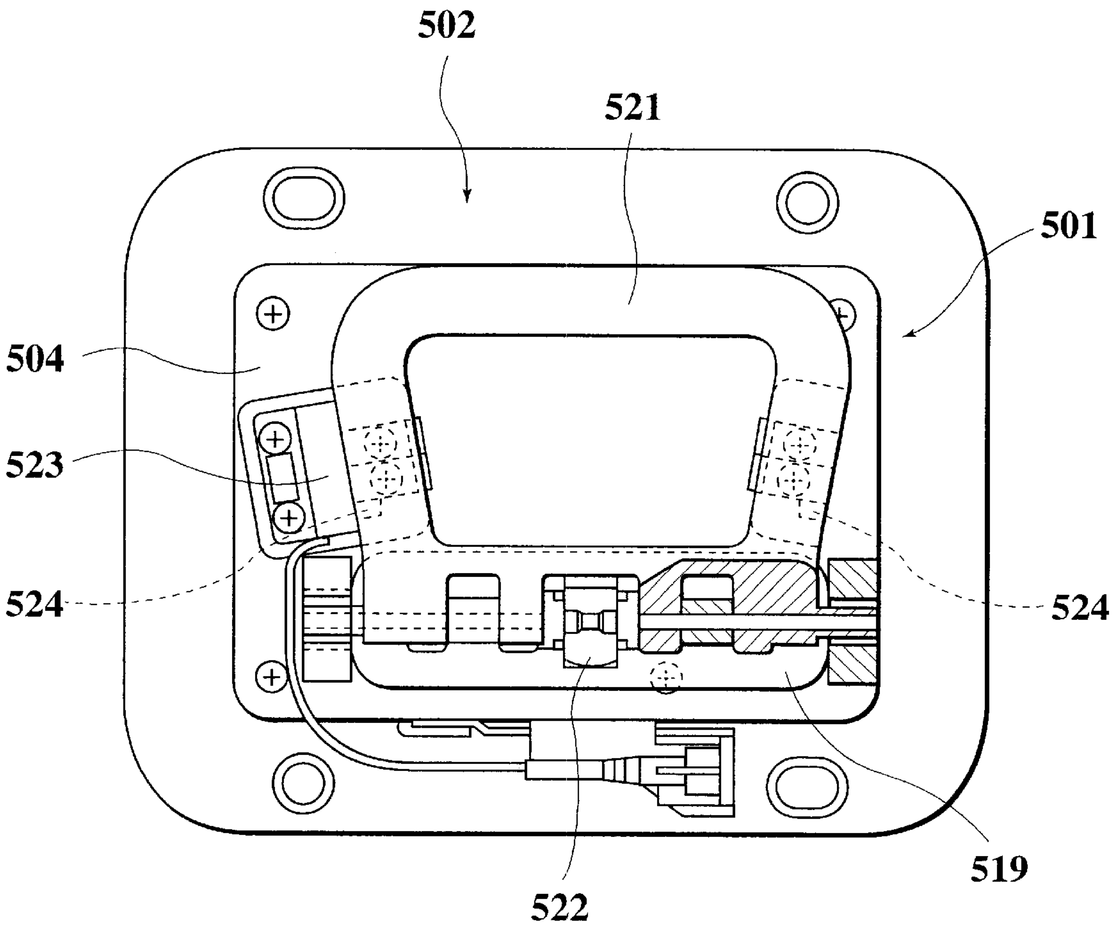
FIG.2 PRIOR ART
FIG. 2 is a plan view showing the conventional power supply shut-off apparatus in which a service plug is mounted to an apparatus body.
Figure 3:
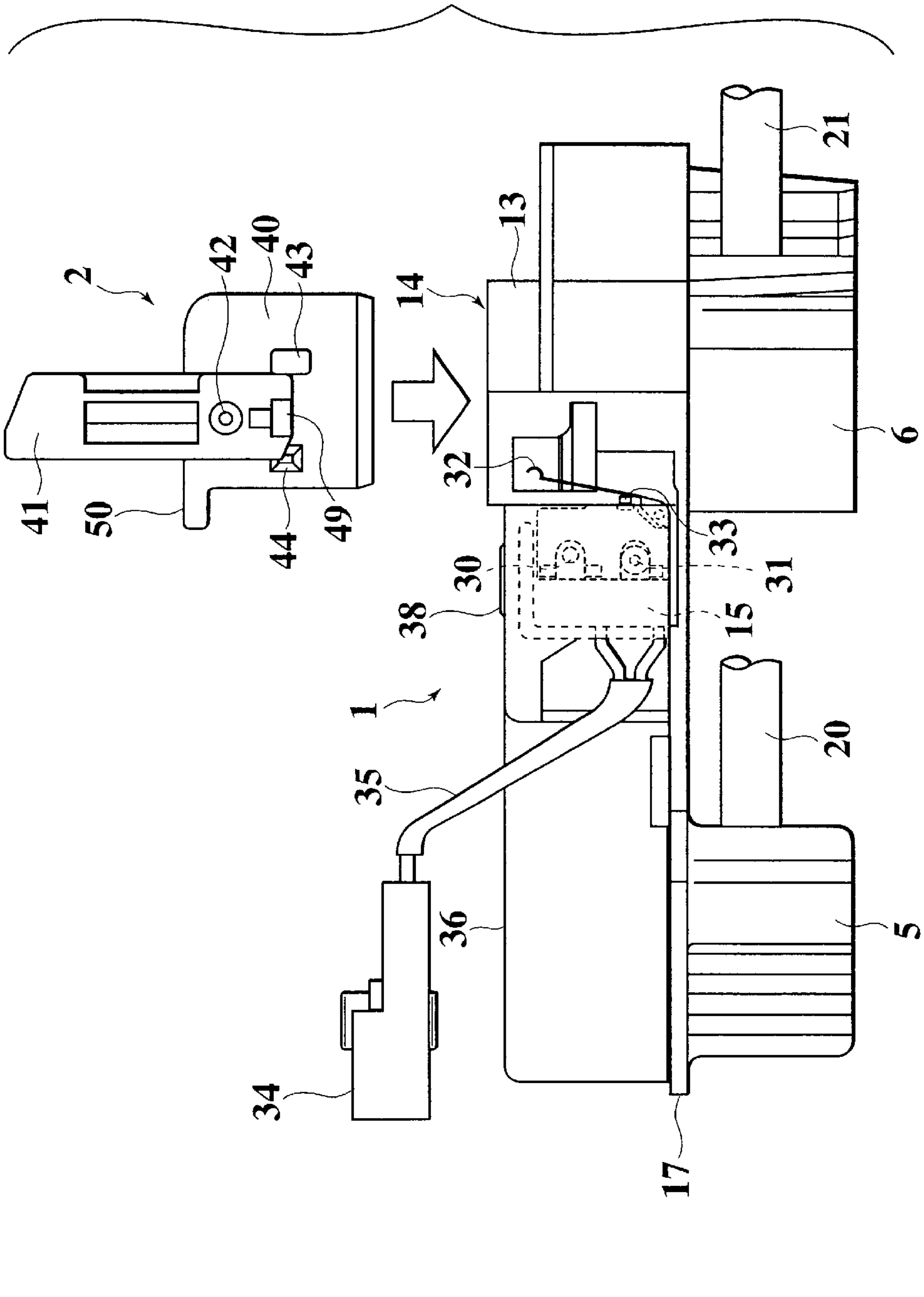
FIG. 3 is a front view showing a power supply shut-off apparatus of an embodiment of the present invention before a service plug is mounted to an apparatus body.

First, a structure of the power supply shut-off apparatus of the present embodiment will be explained. As shown in FIG. 3, the power supply shut-off apparatus is a so-called breaker comprising an apparatus body 1, and a service plug 2 detachably mounted to the apparatus body 1. If the service plug 2 is mounted to the apparatus body 1, the power supply and the load are brought into a conductive state, and if the service plug 2 is detached, the power supply and the load are brought into a nonconductive state.

[Structure of the Apparatus Body]

First, a structure of the apparatus body 1 will be explained with reference to FIGS. 4 to 10. The apparatus body 1 comprises bus bar mounting portions 5, 6 for respectively mounting a load-side bus bar 3 connected to the load which is one of bus bars and a power supply-side bus bar 4 connected to the power supply which is the other bus bar, a fuse mounting portion 10 for mounting a fuse 7. The fuse 7 has a fuse terminal 7*a* to which a terminal 3*a* of the load-side bus bar 3 is connected, and has another fuse terminal 7*a* to which one of side edge terminals 8*a* of an intermediate bus bar 8 is connected. The apparatus body 1 further comprises a plug mounting portion 14. The plug mounting portion 14 includes therein a terminal holding member 12 in which a terminal 4*a* of the power supply-side bus bar 4 and the other side edge terminal 8*b* of the intermediate bus bar 8 are disposed on the opposite sides of an insulation wall 11. The apparatus body 1 further comprises a conduction detecting means mounting portion 16 for mounting a microswitch 15 which is conduction detecting means for detecting a conductive state in which the load-side bus bar 3 and the power supply-side bus bar 4 are in conduction through the fuse 7 and a nonconductive state in which they are out of conduction.

[Structure of the Bus Bar Mounting Portion]

Figure 4:
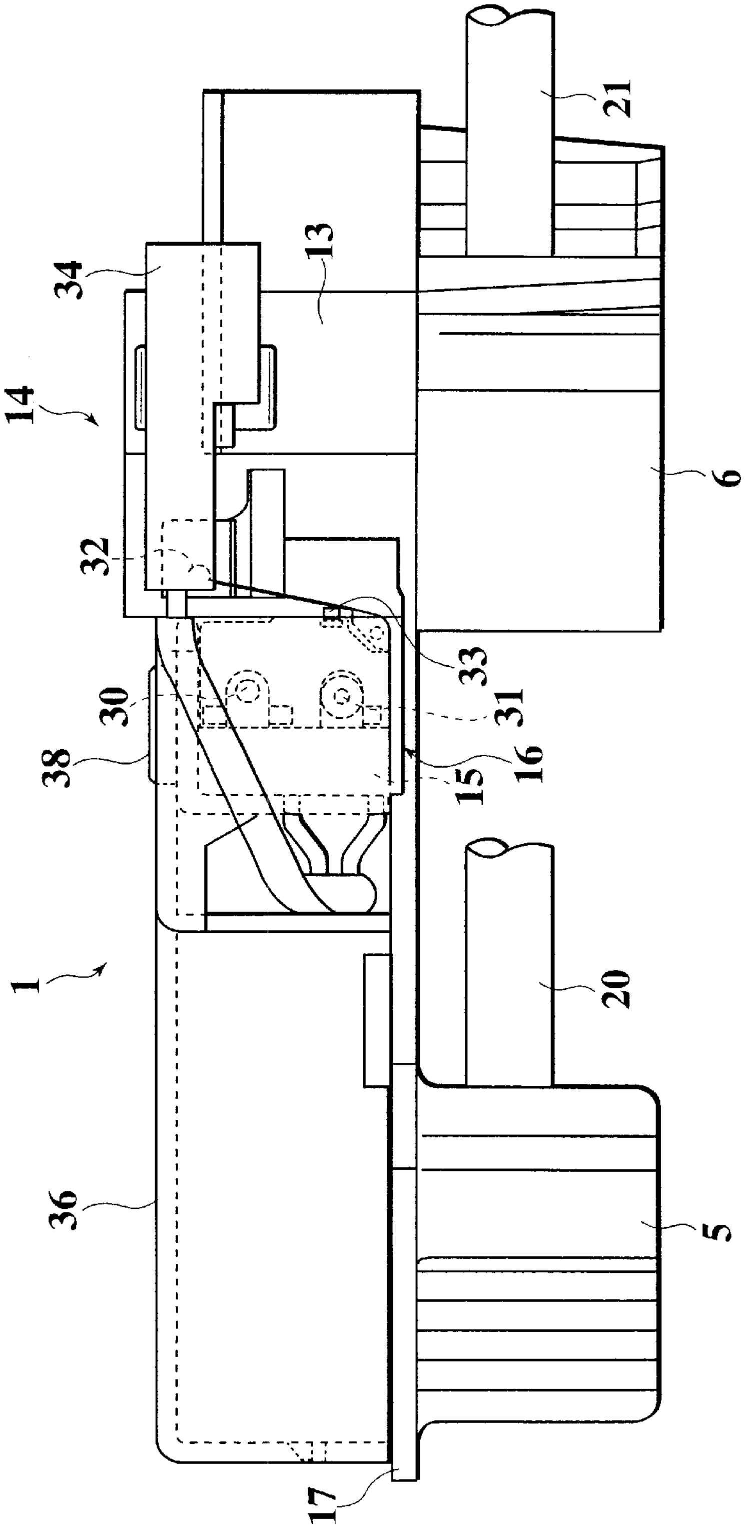
FIG. 4 is a front view showing the apparatus body of the power supply shut-off apparatus of the embodiment.
Figure 6:
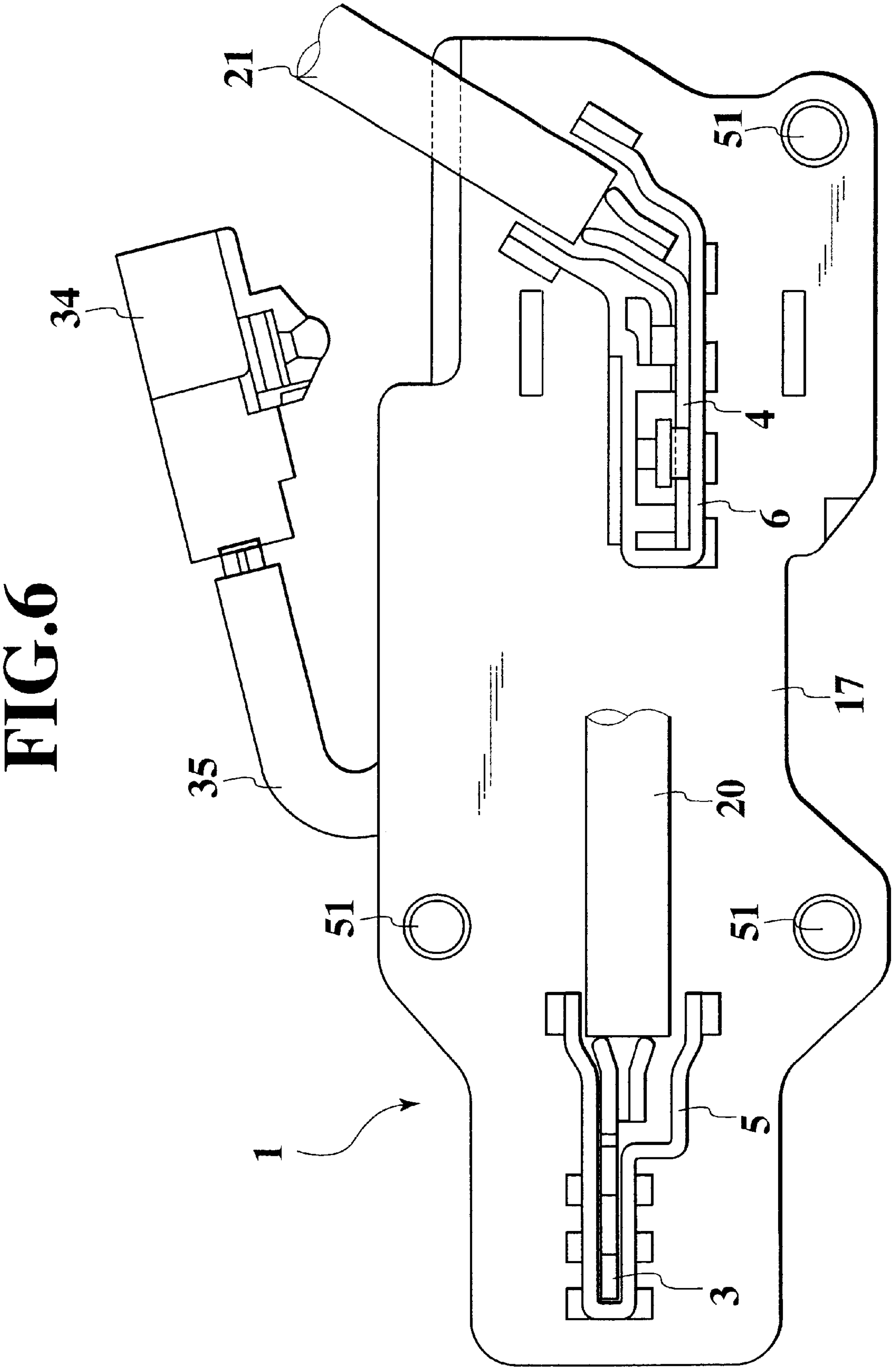
FIG. 6 is a bottom view showing the apparatus body of the power supply shut-off apparatus of the embodiment.
Figure 8:
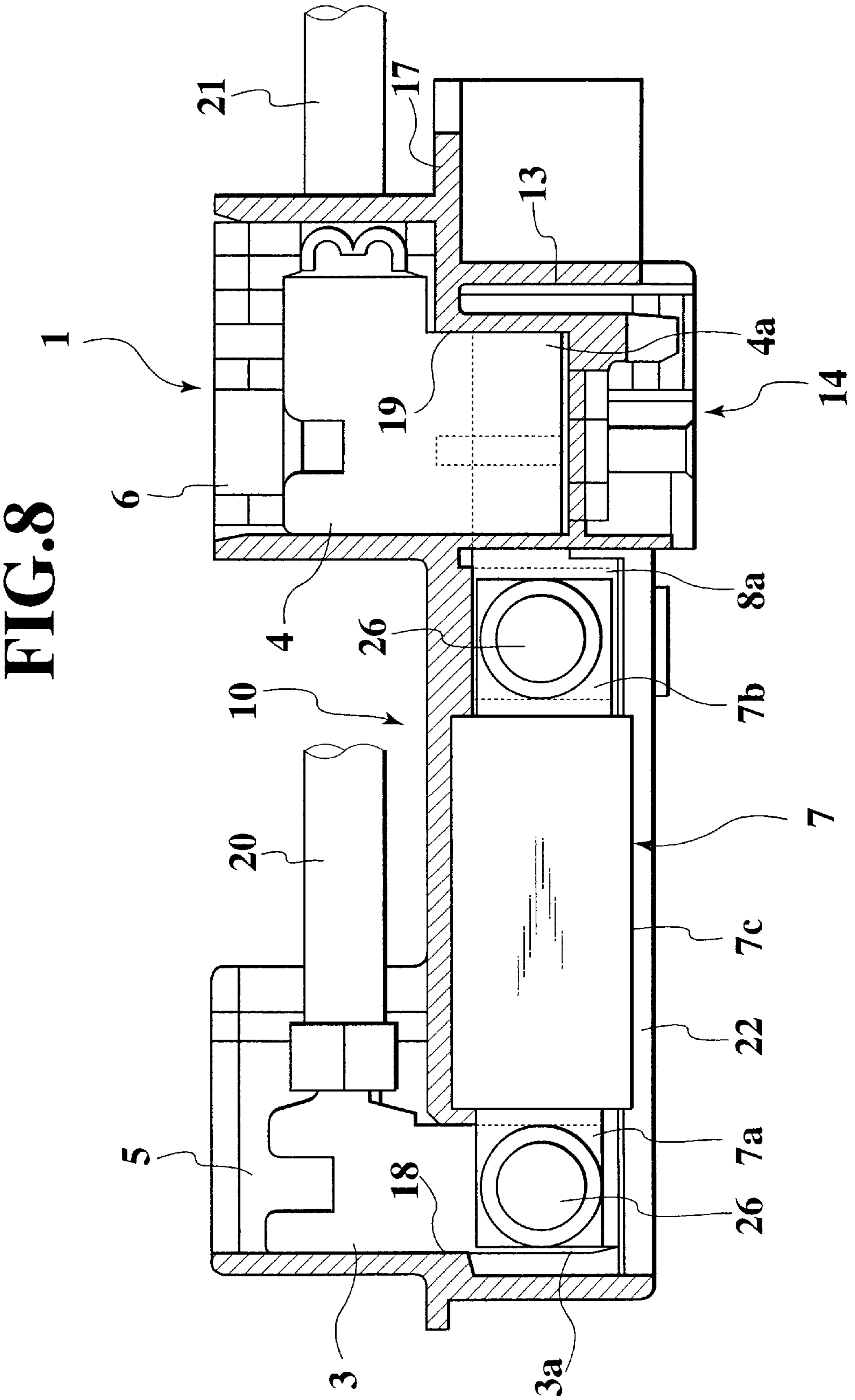
FIG. 8 is a cross sectional view of the apparatus body shown in FIG. 5 taken along the line VIII—VIII in FIG. 5.

As shown in FIGS. 4, 6 and 8, each of the bus bar mounting portions, 5 and 6 is formed such as to project from a back surface of a flat-plate like base 17 having apparatus body mounting holes51, 51, 51 at several locations. As shown in FIG. 6, the bus bar mounting portion 5 for mounting the load-side bus bar 3 is provided closer to a left side end edge in a longitudinal direction of the base 17, and the bus bar mounting portion 6 for mounting the power supply-side bus bar 4 is provided closer to a right side end edge.

The bus bar mounting portions 5 and 6 are formed as partition walls having gaps in which the load-side bus bar 3 and the power supply-side bus bar 4 are respectively accommodated, and the load-side bus bar 3 and the power supply-side bus bar 4 are mounted and held in the gaps. The load-side bus bar 3 and the power supply-side bus bar 4 are respectively inserted into the bus bar mounting portions 5 and 6 from below the base 17, and covered with the partition walls without being exposed.

As shown in FIG. 8, the terminal 3*a* of the load-side bus bar 3 mounted to the bus bar mounting portion 5 faces the base surface through a terminal through hole 18 formed in the base 17. The terminal 4*a* of the power supply-side bus bar 4 also faces the base surface through a terminal through hole 19 formed in the base 17.

A wire 20 connected to the load such as a motor is swaged tot he load-side bus bar 3, and a wire 21 connected to the power supply such as a battery is swaged to the power supply-side bus bar 4.

[Structure of the Fuse Mounting Portion]

As shown in FIGS. 7A to 9, the fuse mounting portion 10 is formed on one side surface of a rising wall 22 formed such as to rise on the side of the surface of the base 17 opposite from the bus bar mounting portions 5 and 6. The fuse mounting portion 10 comprises a body mounting recess 23 in which the fuse body 7*c* is fitted and mounted, and fuse terminal mounting portions 24 and 25 for respectively mounting fuse terminals 7*a* and 7*b* provided on opposite ends of the fuse body 7*c*.

Figure 9:
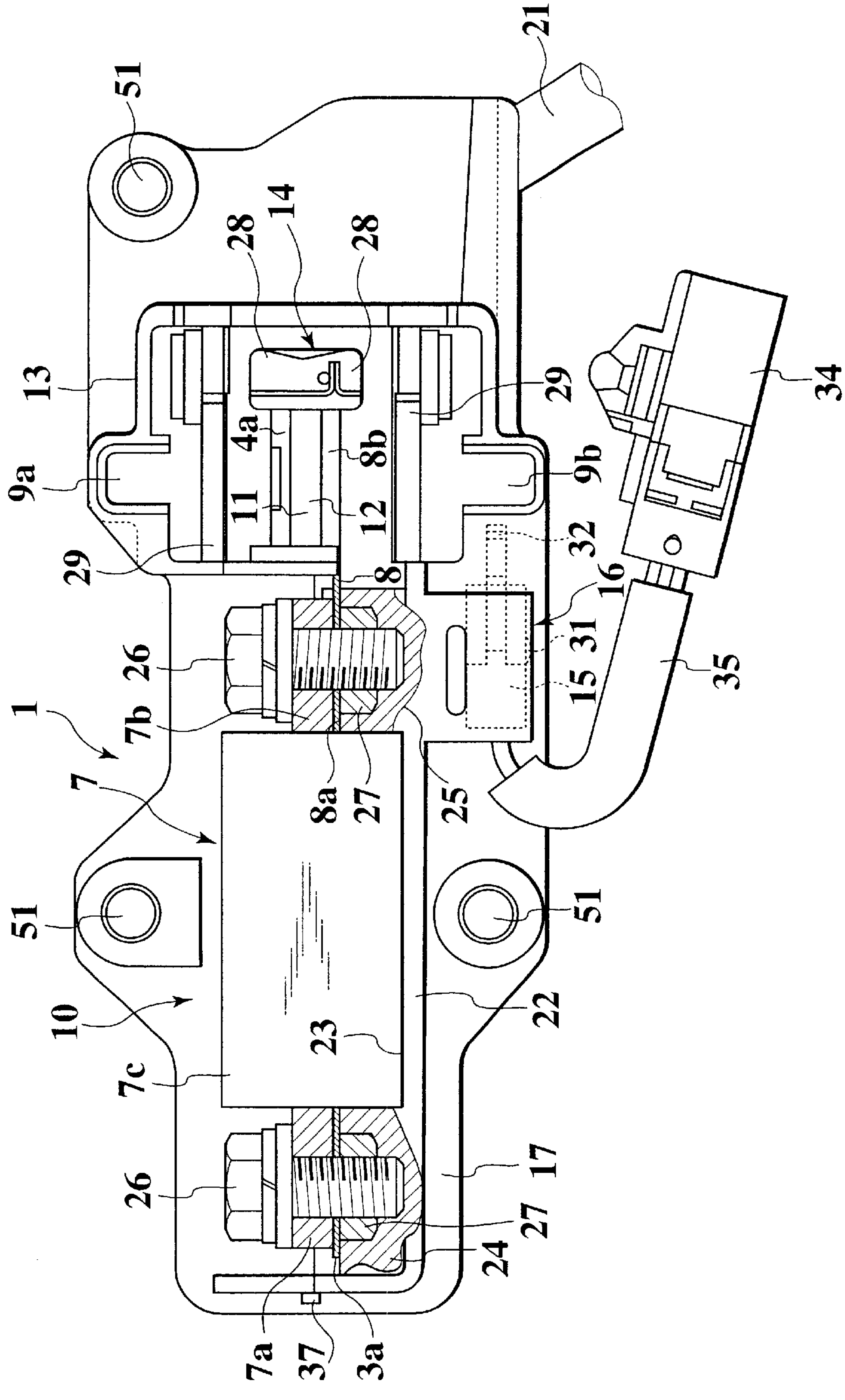
FIG. 9 is a plan view the apparatus body shown in FIG. 5 from which an insulation cover is detached.

As shown in FIG. 9, the apparatus mounting portion is formed a recess in which the fuse body 7*c,* and the fuse 7 is mounted and positioned. The fuse terminal mounting portions 24 and 25 are formed as pedestals projecting from opposite side of the body mounting recess 23. Nuts 27, 27 are embedded in the fuse terminal mounting portions 24 and 25 for screwing the fuse terminals 7*a* and 7*b* into the fuse terminal mounting portions 24 and 25 by means of the fuse mounting bolts 26, 26.

[Structure of the Fuse]

As shown in FIGS. 8 and 9, the fuse mounted to the fuse mounting portion 10 includes the cylindrical fuse body 7*c,* and the pair of plate-like fuse terminal 7*a* and 7*b* provided on opposite ends of the fuse body 7*c*. The fuse 7 is mounted to the fuse mounting portion 10 such that the fuse body 7*c* is fitted in the body mounting portion recess 23, the fuse terminals 7*a* and 7*b* are respectively mounted to the fuse terminal mounting portions 24 and 25, and the bolts 26, 26 are threadedly engaged with the nuts 27, 27 through screw-fixing holes (not shown) formed in the fuse terminals 7*a* and 7*b*.

The terminal 3*a* of the load-side bus bar 3 is fixed to the one fuse terminal mounting portion 24 by the fuse mounting bolt 26 together with the fuse terminal 7*a*. With this, the load-side bus bar 3 and the fuse 7 are electrically connected to each other. One of side edge terminals 8*a* of the intermediate bus bar 8 is fixed to the other fuse terminal mounting portion 25 together with the fuse terminal 7*b* by the fuse mounting bolt 26. With this, the intermediate bus bar 8 and the fuse 7 are electrically connected to each other.

As shown in FIGS. 8 and 9, the intermediate bus bar 8 is formed as one sheet of conductor plate comprising the terminal connected to the one fuse terminal 7*b* and the terminal 8*b* disposed on one of the side walls of the insulation wall 11 which will be described later.

[Structure of the Plug Mounting Portion]

As shown in FIGS. 5A, 8A and 9, the plug mounting portion 14 is a mounting portion to which the service plug 2 which will be described later can be attached and detached, and comprises a partition wall 13 formed with a space in which the service plug 2 can be accommodated. The partition wall 13 rises on the side of the surface of the base 17, and accommodates the service plug 2 therein. The plug mounting portion 14 is provided with positioning recesses 9*a* and 9*b* which makes it impossible to mount the service plug 2 unless a tilting lever 41 which will be described later is held-substantially vertically and the lever 41 is directed in a predetermined direction.

Figure 5:
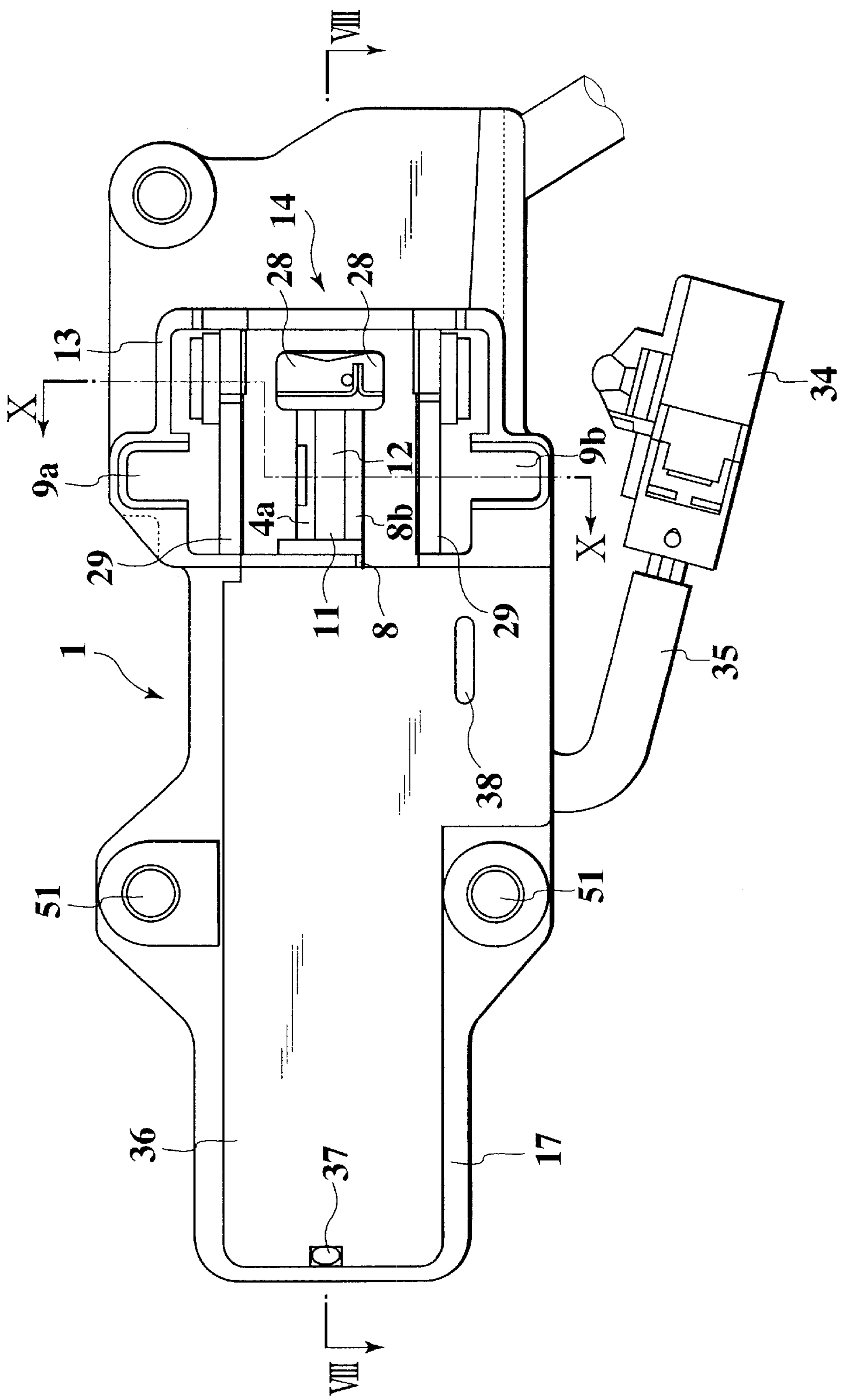
FIG. 5 is a plan view showing the apparatus body of the power supply shut-off apparatus of the embodiment.
Figure 10:
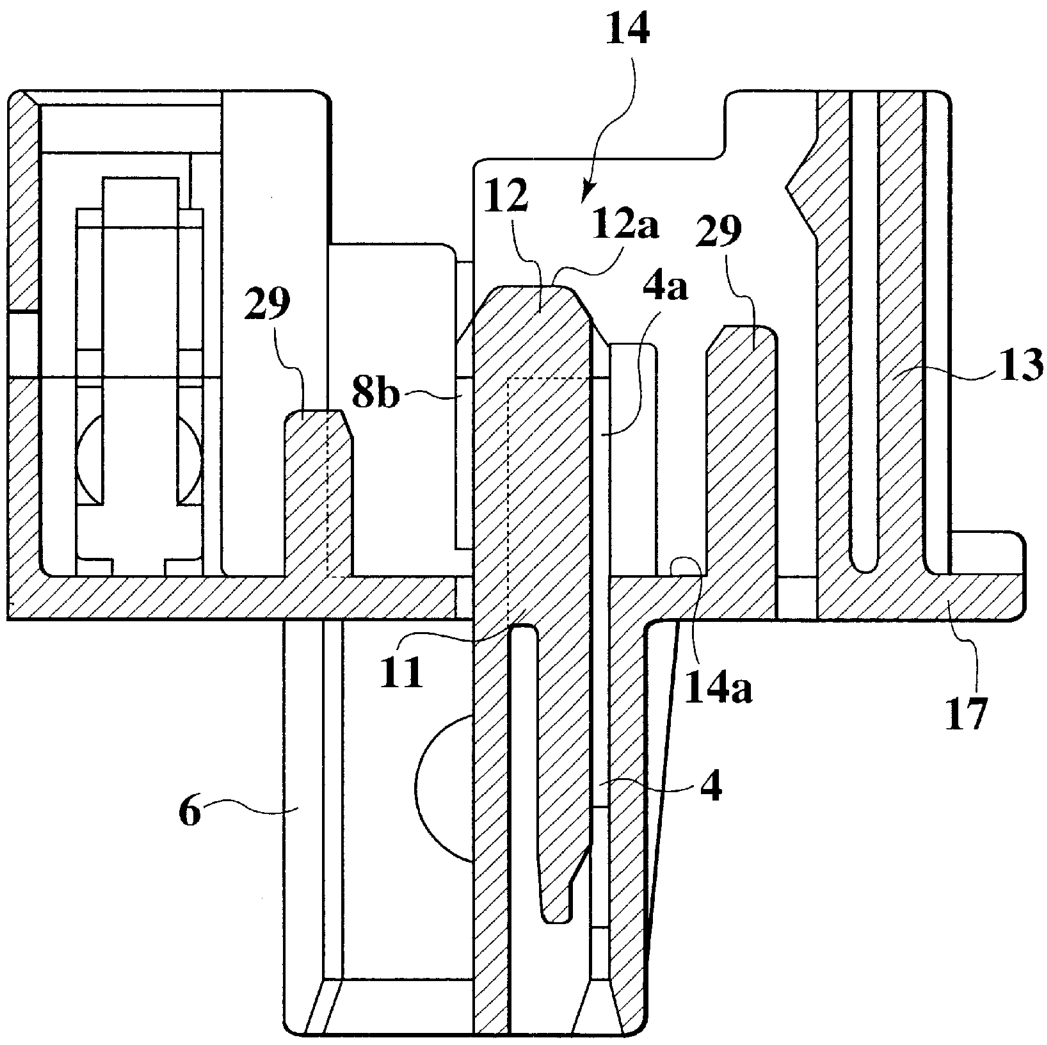
FIG. 10 is a cross sectional view of the apparatus body shown in FIG. 5 taken along the line X—X in FIG. 5.

As shown in FIGS. 5 and 10, a terminal holding member 12 rises from a substantially central portion of the plug mounting portion 14. On the terminal holding member 12, the terminal 4*a* of the power supply-side bus bar 4 and the other side edge terminal 8*b* of the intermediate bus bar 8 are disposed on the opposite sides of the insulation wall 11. The terminal holding member 12 has a function to bring the terminal 4*a* of the power supply-side bus bar 4 and the terminal 8*b* of the intermediate bus bar 8 out of electric conduction, and has a function to hold them.

Figure 7A:
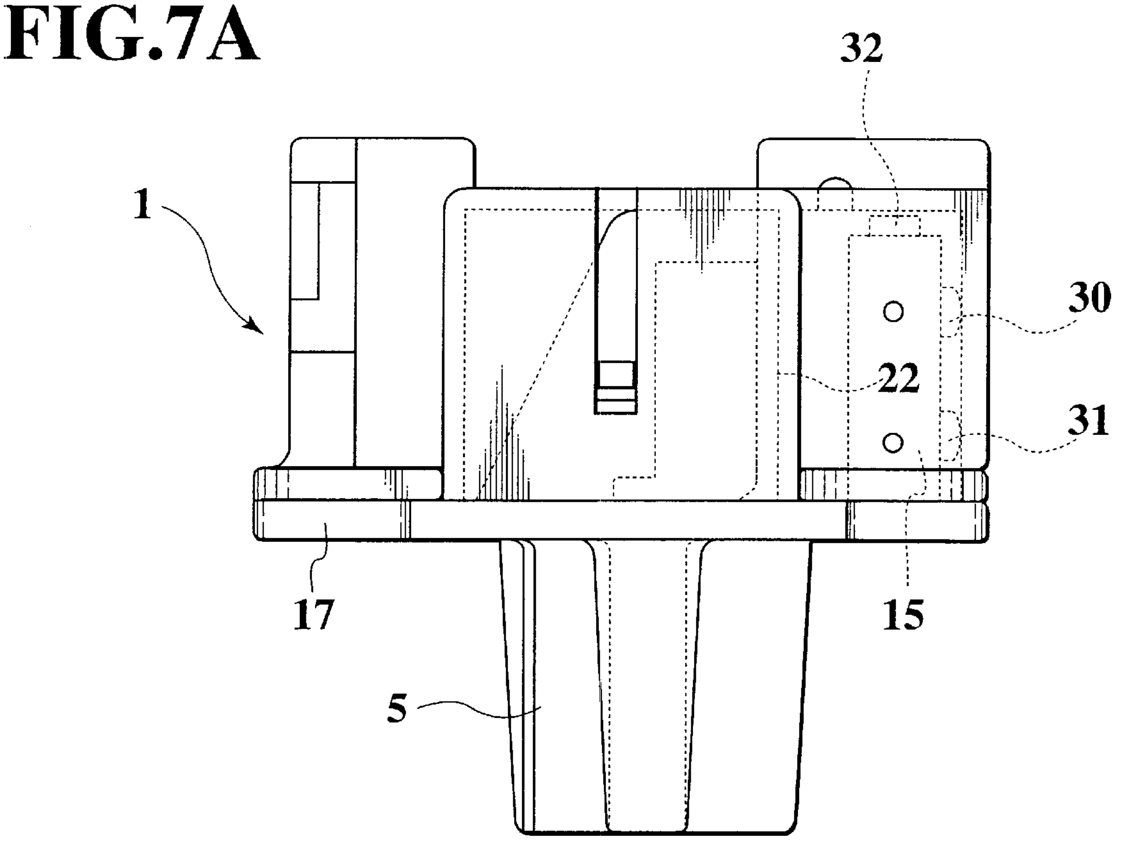
Figure 7B:
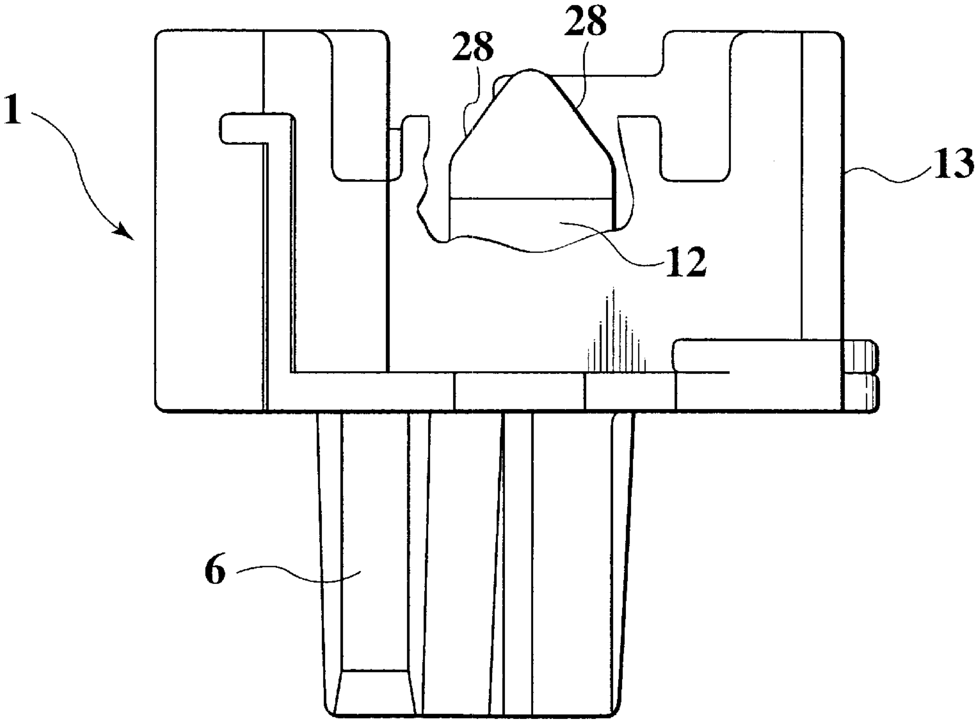

As shown in FIGS. 5, 7A and 7B, the terminal holding member 12 is formed with pick-up slanting surfaces 28, 28 which function to smoothly mount a terminal member 39 provided on the service plug 2 which will be described later. Each of the pick-up slanting surfaces 28, 28 is slanting downward, and makes it easy to insert the terminal member 39 into the terminal holding member 12.

As shown in FIGS. 5 and 10, the plug mounting portion 14 is provided with guide members 29, 29 which come into contact with side surfaces 40*a,* 40*b* of a plug housing 40 of the service plug 2 which will be described later to stabilize the mounting state of the plug housing 40. The guide members 29, 29 are formed as rising walls rising from a bottom surface 14*a* of the plug mounting portion 14, and are disposed on the opposite sides of the terminal holding member 12.

[Structure of Conduction Detecting Means Mounting Portion]

As shown in FIGS. 4, 7A, 7B and 9, the conduction detecting means mounting portion 16 is provided on the other side surface of the rising wall 22 which is opposite from the fuse terminal mounting portion 25 to which the terminal 8*a* of the intermediate bus bar 8 is mounted. The conduction detecting means mounting portion 16 is formed such as to project to the opposite side from the fuse terminal mounting portion 25, and the microswitch 15 is fixed to the side wall.

The microswitch 15 detects the conductive state in which the load-side bus bar 3 and the power supply-side bus bar 4 are in conduction through the fuse 7 and the nonconductive state in which they are out of conduction. As shown in FIG. 4, the microswitch 15 is inserted through and positioned in the switch positioning shaft 30, and mounted to the conduction detecting means mounting portion 16 by a switch mounting screw 31. A movable lever 32 of the microswitch 15 is provided such as to face interior of the plug mounting portion 14, and turns the microswitch 15 ON and OFF by tilting the movable lever 32 by a shaft 49 provided on the tilting lever 41 to push a contact 33 into a switch body. A wire 35 connected to a conduction detecting connector 34 is connected to the microswitch 15.

[Structure of Insulation Cover]

As shown in FIGS. 4 and 5, an insulation cover 36 for accommodating the fuse 7 and the microswitch 15 therein is mounted to the apparatus body 1. The insulation cover 36 is a box-like cover whose lower portion and a connection portion are opened, and the microswitch 15 and the wire 35 are connected to the connection portion. The insulation cover 36 is engaged with positioning projections 37 and 38 formed on the rising wall 22. The fuse 7 and the microswitch 15 are covered with this insulation cover 36 so that the fuse 7 and the microswitch 15 are prevented from being damaged by unintentional external force.

[Structure of the service plug]

The service plug 2 will be explained with reference to FIGS. 11A, 11B, 12A and 12B next. The service plug comprises the plug housing 40 and the tilting lever 41. The plug housing 40 is detachably mounted to the plug mounting portion 14 astride the terminal holding member 12, and includes the terminal member 39 which comes into contact with the terminal 4*a* of the power supply-side bus bar 4 and the other side edge terminal 8*b* of the intermediate bus bar 8 to bring the load-side bus bar 3 and the power supply-side bus bar into conduction. The tilting lever 41 is provided such that it can tilt between the substantially vertical state and the substantially horizontal state with respect to the plug housing 40.

[Structure of the plug housing]

As shown in FIGS. 11A, 11B, 12A and 12B, the plug housing 40 is formed as a substantially rectangular insulation block having a size capable of fitting between the pair of guide members 29, 29 of the plug mounting portion 14, and is provided at is opposite side walls 40*a* and 40*b* with rotation shafts 42, 42 for tiltably mounting the tilting lever 41.

Figure 11A:
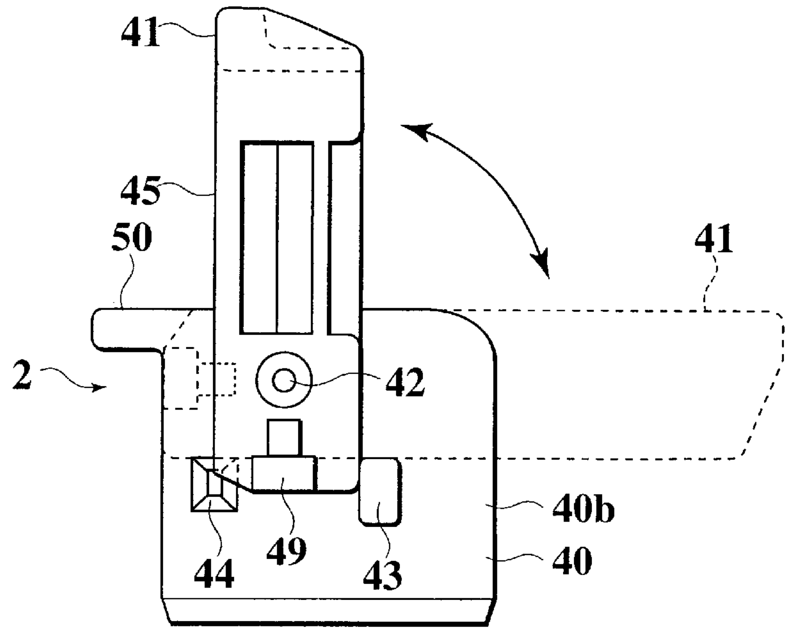

The opposite side walls 40*a* and 40*b* are provided with tilting lever tilting prevention projections 43, 43 for preventing the tilting lever 41 from tilting in the direction opposite from its tilting direction in the substantially horizontal state shown with phantom lines in FIG. 11A. When the tilting lever 41 is in the substantially vertical state shown with solid line in FIG. 11A, the tilting lever tilting prevention projections 43, 43 come into contact with the tilting lever 41 near its base end which is pivotally supported so as to prevent the tilting lever 41 from tilting in the direction opposite from the normal direction. When the tilting lever 41 is brought into the substantially horizontal state, the tilting lever tilting prevention projections 43, 43 abut against the tilting lever 41 to hold the horizontal state of the tilting lever 41.

Figure 11B:
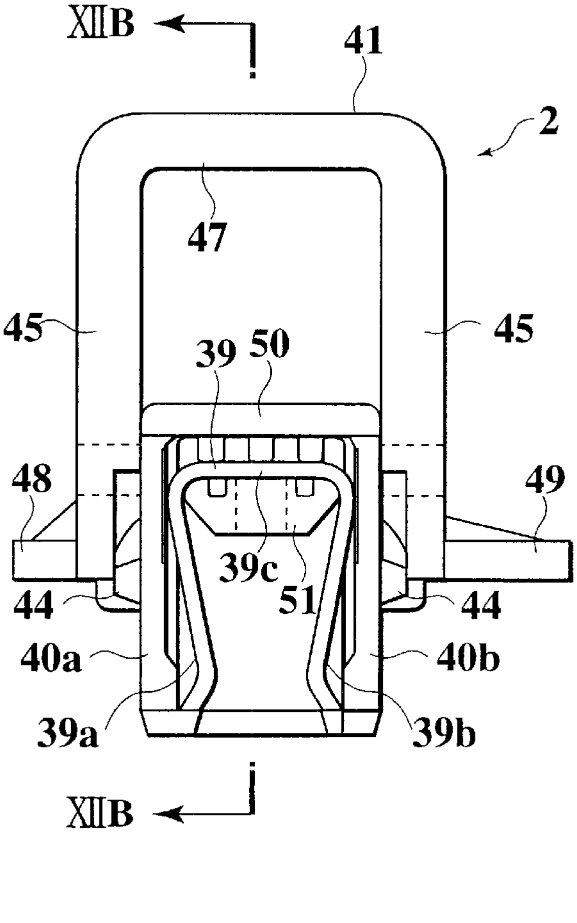
Figure 12A:
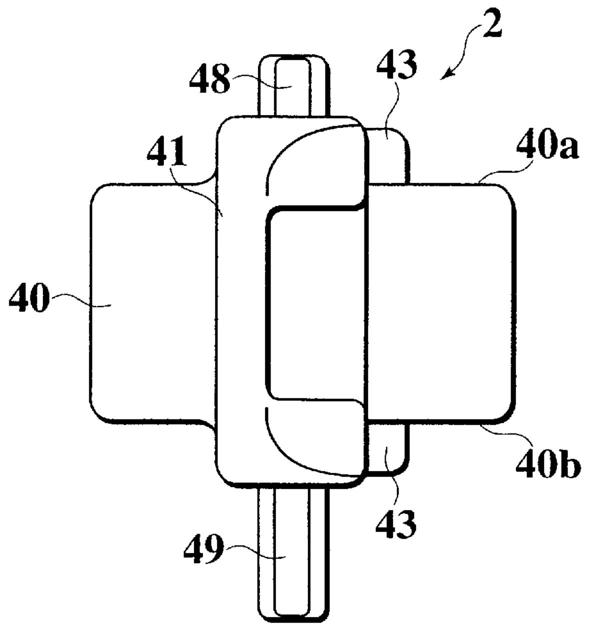
Figure 12B:
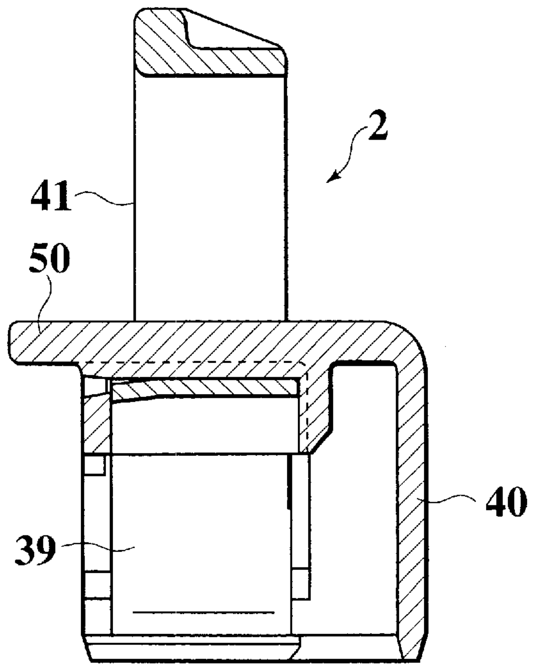
Figure 13A:
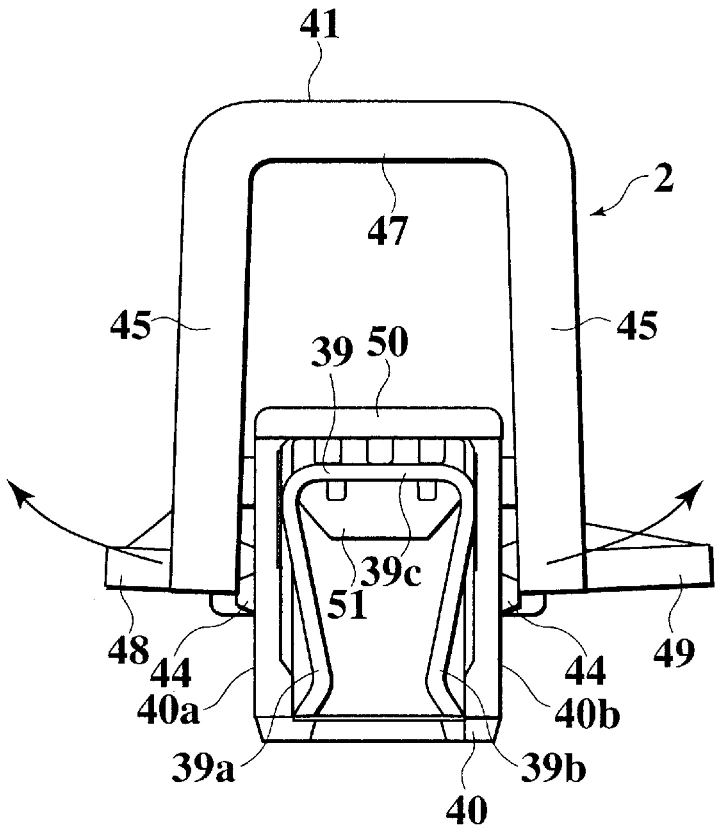
Figure 13B:
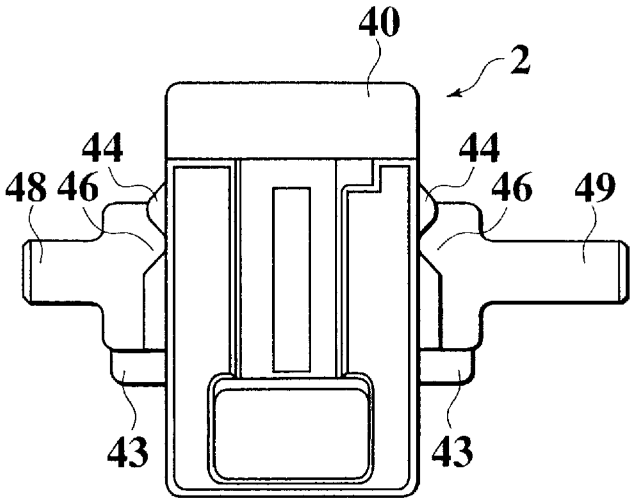

As shown in FIGS. 11A and 11B, the opposite side walls 40*a* and 40*b* are provided with plug incomplete mounting preventing projections 44, 44 for deflecting the tilting lever 41 to provide click feeling when the tilting lever 41 is tilted from the substantially vertical state to the horizontal state at substantially the same height as the tilting lever tilting prevention projections 43, 43. Each of the plug incomplete mounting preventing projections 44, 44 is formed as a projection having a rectangular prism shape for example, and the plug incomplete mounting preventing projections 44, 44 engaged with the engaging projections 46, 46 formed on the base ends of both arm 45, 45 of the tilting lever 41 shown in FIG. 13A during the course of tilting movement of the tilting lever 41 from the vertical state to the horizontal state.

In addition to the click feeling, the plug incomplete mounting preventing projections 44, 44 also function such that when the tilting lever 41 is tilted in the horizontal direction in the incompletely mounted state, the engaging projections 46, 46 of the tilting lever 41 rides over the plug incomplete mounting preventing projections 44, 44 so that the arms 45, 45 are deflected outwardly (in the direction shown with the arrow), and the shafts 48 and 49 of the tilting lever 41 abut against the inner surface of the partition wall of the plug mounting portion 14 to prevent the tilting lever 41 from tilting horizontally. That is, the plug incomplete mounting preventing projections 44, 44 have function to reliably prevent the service plug 2 from being incompletely mounted to the plug mounting portion 14.

As shown in FIGS. 11A and liB, a cover pushing portion 50 projects from the plug housing. The cover pushing portion 50 has a function to push the insulation cover 36 from above when the service plug 2 is mounted to the plug mounting portion 14. The cover pushing portion 50 is formed on the upper end edge of the plug housing 40 which is on the opposite side from the tilting direction of the tilting lever 41.

As shown in FIGS. 11A, 11B, 12A and 12B, in the space surrounded by the opposite side walls 40*a* and 40*b* of the plug housing, there is provided the terminal member 39 which is mounted astride the terminal holding member 12, and which comes into contact with the terminal 4*a* of the power supply-side bus bar 4 and the other side edge terminal 8*b* of the intermediate bus bar 8 to bring the load-side bus bar 3 and the power supply-side bus bar into conduction. The terminal member 39 comprises a contact terminal 39*a* which comes into contact with the terminal 4*a* of the power supply-side bus bar 4, a contact terminal 39*b* which comes into contact with the terminal 8*b* of the intermediate bus bar 8, and a substantially inverted U-shaped spring plate member having a connection portion for connecting these contact terminals. The terminal member 39 is mounted to the plug housing 40 by holding the connection portion 39*c* to the terminal holding portion 51.

Both the contact terminals 39*a* and 39*b* are formed such that tip ends thereof approach each other, and a distance therebetween is such a degree that the terminal holding member 12 can be grasped therebetween with biasing force. Therefore, the terminal 4*a* of the power supply-side bus bar 4 and the terminal 8*b* of the intermediate bus bar 8 provided on the opposite sides of the insulation wall 11 of the terminal holding member 12 are grasped in a state where they are pushed by both the contact terminals 39*a* and 39*b* so that they can be connected to each other reliably. The tip ends of the contact terminals 39*a* and 39*b* are bent outwardly so that they can easily be fitted to the terminal holding member 12.

[Structure of the Tilting Lever]

As shown in FIGS. 11A, 11B, 12A and 12B, the tilting lever 41 is formed as a substantially U-shaped lever having the pair of arms 45, 45 and a lever operating portion 47 for connecting the arms 45, 45 with each other. The tilting lever 41 can tilt around the rotation shafts 42, 42 by inserting the rotation shafts 42, 42 of the plug housing 40 through the circular holds formed in the arms 45, 45.

The arms 45, 45 are formed at their base ends with the shafts 48 and 49 which project outwardly. The shafts 48 and 49 face the positioning recesses 9*a* and 9*b* respectively, and their projecting lengths are different so that the service plug 2 should not be mounted to the plug mounting portion 14 in the wrong direction.

Figure 15C:
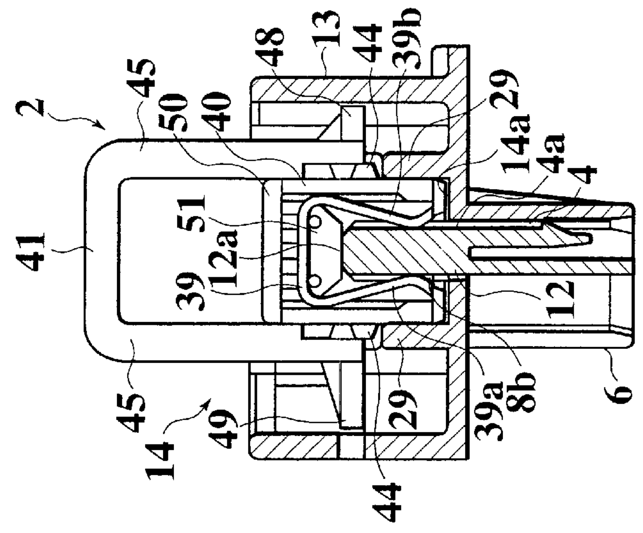
FIG. 15C is a cross sectional view showing a state where the service plug is properly mounted.
Figure 15B:
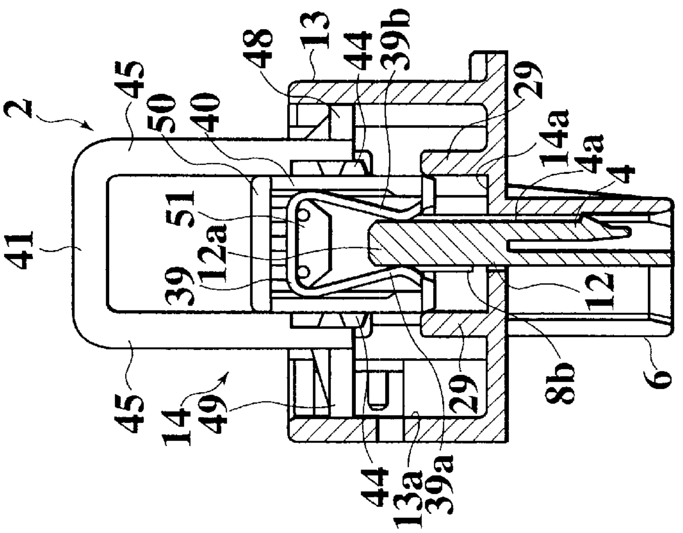
Figure 15A:
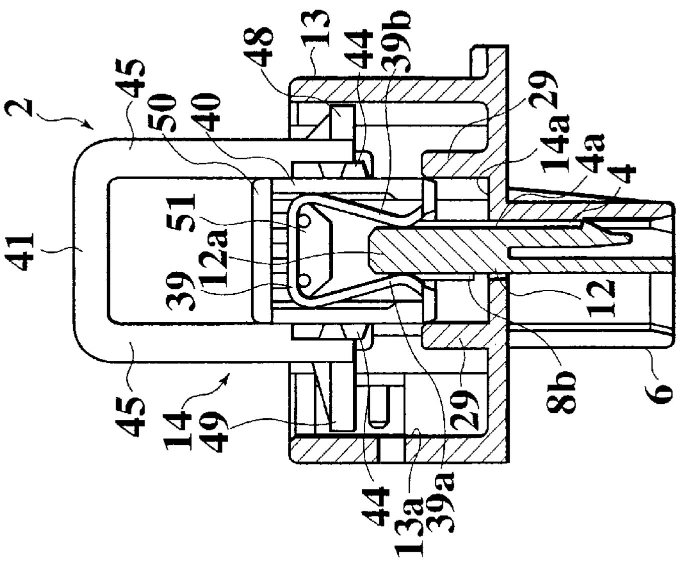

For example, the projecting length of the shaft 48 of the contact terminal 39*a* connected to the terminal 4*a* of the power supply-side bus bar 4 is set shorter than that of the other shaft 49. Further, as shown in FIGS. 15A, 15B and 15C, the lengths of the shafts 48 and 49 are set such that when the plug housing 40 is mounted to the plug mounting portion 14 in a state where the tilting lever 41 rises substantially vertically, a gap is created between the partition wall inner surface 13*a* constituting the plug mounting portion 14 and the shafts 48 and 49.

<Explanation of Operation of the Power Supply Shut-off Apparatus>

Methods for connecting and disconnecting the load and the power supply by the power supply shut-off apparatus constituted in the above-described manner will be explained with reference to FIGS. 14 and 16.

[Mounting Operation of the Service Plug]

First, a procedure for mounting the service plug 2 to the plug mounting portion 14 of the apparatus body 1 to bring the load-side bus bar 3 and the power supply-side bus bar 4 into conduction (procedure for bringing the load-side bus bar 3 and the power supply-side bus bar 4 into conduction) will be explained. As shown in FIG. 3, the service plug 2 is inserted in the plug mounting portion 14 in the normal direction in a state where the tilting lever 41 is held substantially vertically.

When the service plug 2 is not directed to the normal direction, the shafts 48 and 49 do not coincide the positioning recess 9*a* formed in the plug mounting portion 14, the longer shaft 49 comes into contact with the partition wall 13 of the plug mounting portion 14, and the service plug 2 can not be mounted to the plug mounting portion 14.

If the service plug 2 is mounted to the plug mounting portion 14 in the normal direction, as shown in FIG. 15A, the terminal member 39 of the plug housing 40 is guided by the pick-up slanting surfaces 28, 28 formed on the tip ends of the terminal holding member 12 provided on the plug mounting portion 14, and the plug housing 40 is inserted and engaged while being guided by the terminal holding member 12 as a guide. In the service plug 2, the opposite side walls 40*a* and 40*b* of the plug housing 40 are guided by the guide members 29, 29 provided on the opposite sides of the terminal holding member 12.

If the service plug 2 is further pushed to the bottom of the plug mounting portion 14, the plug housing 40 is mounted while being guided by the terminal holding member 12 and the guide members 29, 29 and finally, the terminal holding portion 51 of the plug housing 40 abuts against the tip end surface 12*a* of the terminal holding member 12 as shown in FIG. 15C. With this, the terminal 8*b* of the intermediate bus bar 8 and the terminal 4*a* of the power supply-side bus bar 4 come into contact with the terminal member 39, the load-side bus bar 3 and the power supply-side bus bar 4 are brought into conduction through the fuse 7 which is disposed in series and as a result, the power supply and the load are brought into conduction.

Figure 14:
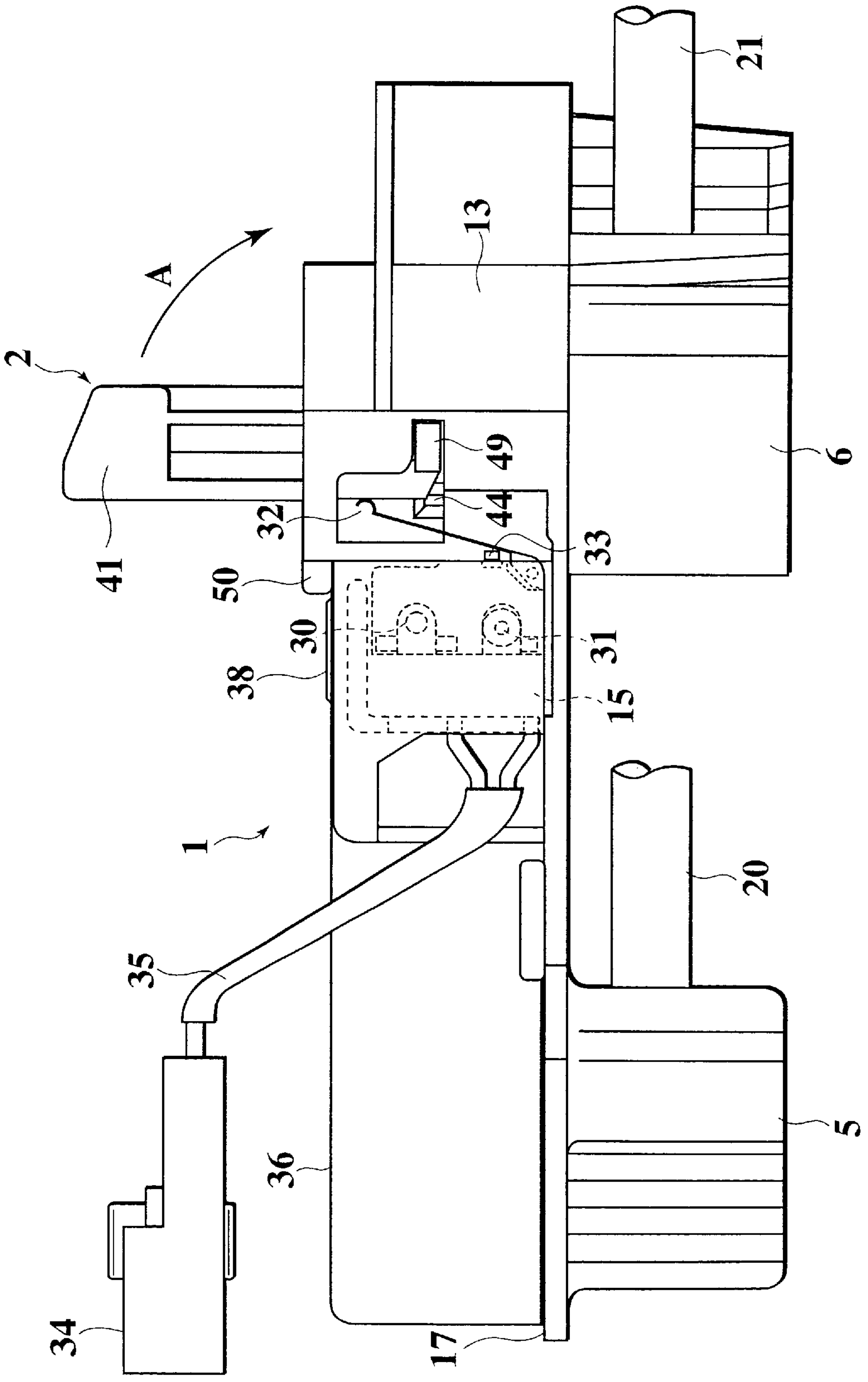
FIG. 14 is a front view of the power supply shut-off apparatus before the service plug is mounted and a tilting lever is tilted.

In this state, as shown in FIG. 14, the tilting lever 41 rises vertically, the tip end of the movable lever 32 of the microswitch 15 comes into contact with the tilting lever 41, but the microswitch 15 is still OFF.

Next, the tilting lever 41 is tilted down in the direction A shown with the arrow as shown in FIG. 14 from the state where the service plug 2 is completely mounted to the plug mounting portion 14. Then, the engaging projections 46, 46 provided on the arms 45, 45 of the tilting lever 41 engage the plug incomplete mounting preventing projections 44, 44 of the plug housing 40. With this, the fact that the tilting lever 41 is tilted is transmitted to the operator as click feeling. At that time, as shown in FIG. 15B, when the service plug 2 is incompletely mounted (when the terminal holding portion 51 is not in contact with the tip end surface 12*a* of the terminal holding member 12), the tip ends of the shafts 48 and 49 provided on the arms 45, 45 come into contact with the partition wall inner surface 13*a* constituting the plug mounting portion 14 so that the tilting lever 41 does not tilted any more.

Figure 16:
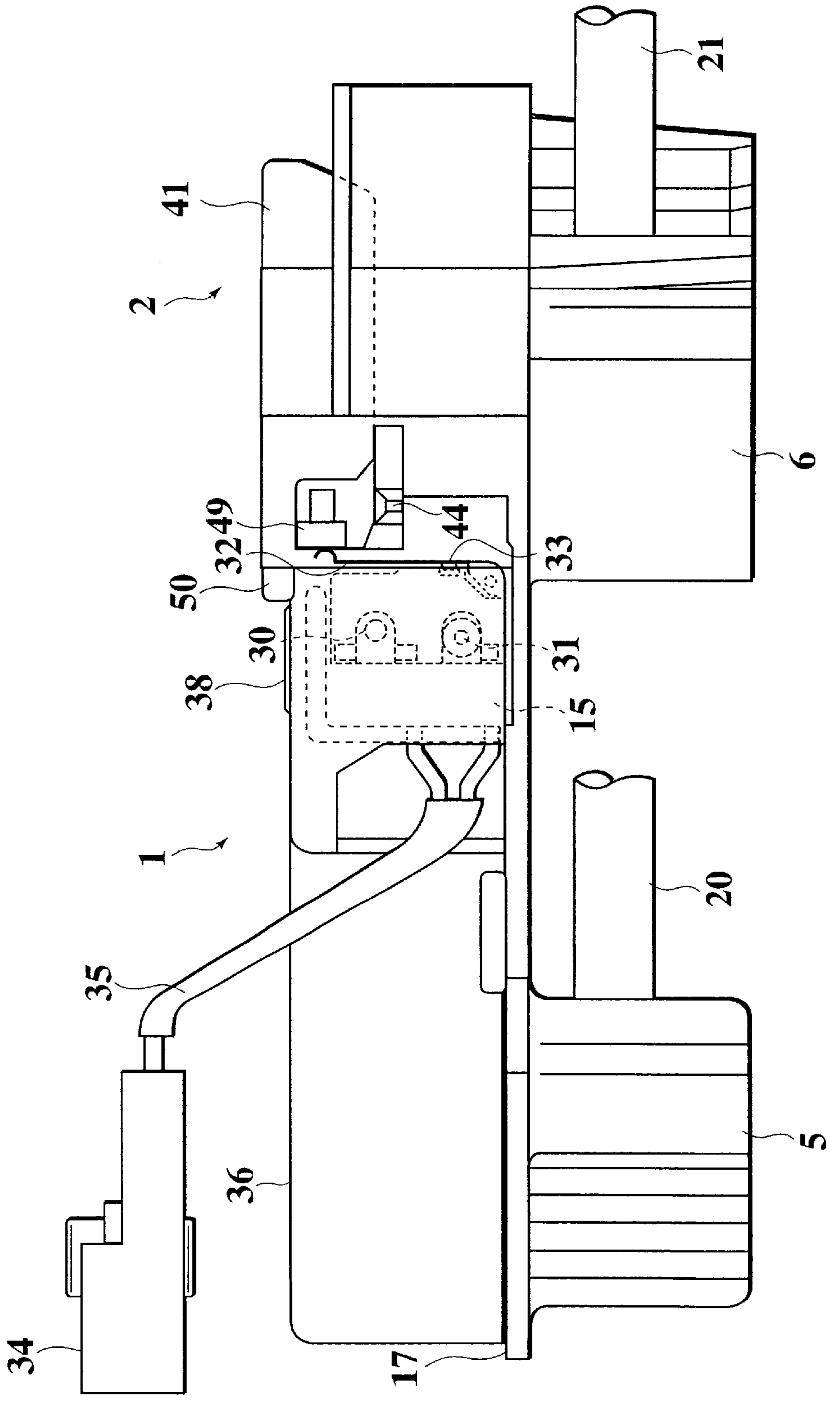
FIG. 16 is a front view of the power supply shut-off apparatus showing a state where the service plug is mounted to the apparatus body and the tilting lever is tilted horizontally.

If the tilting lever 41 is further tilted, the movable lever 32 is tilted toward the microswitch body by the longer shaft 49 and when the tilting lever 41 finally reaches the substantially horizontal state as shown in FIG. 16, the movable lever 32 pushes the contact 33. With this, the microswitch 15 detects that the service plug 2 is mounted to the plug mounting portion 14 in the normal state, and that the load-side bus bar 3 and the power supply-side bus bar 4 are brought into conduction.

[Detaching operation of the Service Plug]

Next, a procedure for pulling the service plug 2 from the plug mounting portion 14 of the apparatus body 1 to bring the load-side bus bar 3 and the power supply-side bus bar 4 out of conduction (procedure for bringing the load-side bus bar 3 and the power supply-side bus bar 4 out of conduction) will be explained. This procedure is the reverse of the above-described conduction procedure. That is, the tilting lever 41 of the service plug 2 which is in the substantially horizontal state shown in FIG. 16 is grasped to raise this tilting lever 41 in the vertical direction. In this process, the movable lever 32 which has been tilted down toward the microswitch body by the shaft 49 is separated from the contact 33 and is returned to the stand-by position which is the position before the plug is mounted, and an ON signal of the microswitch 15 is changed to an OFF signal.

The tilting lever 41 which has been raised to the vertical state is grasped and pulled upwardly, and the plug housing 40 is pulled out from the plug mounting portion 14. With this movement, the contact between the terminal member 39 provided on the plug housing 40 and the terminal 8*b* of the intermediate bus bar 8 and the terminal 4*a* of the power supply-side bus bar 4 are released, the load-side bus bar 3 and the power supply-side bus bar 4 are brought out of conduction, and the conduction between the power supply and the load is interrupted.

As described above, in the present embodiment, the terminal holding member 12 in which a terminal 4a of the power supply-side bus bar 4 and the other side edge terminal 8*b* of the intermediate bus bar 8 are disposed on the opposite sides of an insulation wall 11 is provided in the plug mounting portion 14 which mounts the service plug 2 to the apparatus body 1, the plug housing 40 having a terminal member 39 which is mounted astride the terminal holding member 12 and which comes into contact with the terminal 4*a* of the power supply-side bus bar 4 and the other side edge terminal 8*b* of the power supply-side bus bar 4 to bring the load-side bus bar 3 and the power supply-side bus bar 4 into conduction is mounted to the plug mounting portion 14. Therefore, the terminal holding member 12 serves as a guide, and even if the power supply shut-off apparatus is disposed in a place where the operation is difficult, the service plug can easily be mounted.

In the present embodiment, since the tilting lever 41 is tiltably mounted to the plug housing 40, when the service plug 2 is mounted to or removed from the plug mounting portion 14, the plug can easily be mounted by holding the tilting lever 41.

Further, according to the present embodiment, when the plug housing 40 is mounted to the plug mounting portion 14 and the tilting lever 41 is tilted down substantially horizontally in a state where the tilting lever 41 of the service plug 2 is held in the substantially vertical state, the shaft 49 provided on the tilting lever 41 falls the movable lever 32 of the microswitch 15 so as to allow the microswitch 15 to detect the conduction state between the load-side bus bar 3 and the power supply-side bus bar 4. Therefore, even if the plug housing 40 is fitted to the plug mounting portion 14 and the load-side bus bar 3 and the power supply-side bus bar 4 are brought into conduction, this conduction state is not detected by the microswitch 15 unless the tilting lever 41 is tilted horizontally to fall the movable lever 32. Thus, after the load-side bus bar 3 and the power supply-side bus bar 4 are brought into conduction, it is possible for an operator to allow the microswitch 15 to detect the conduction state with a time lag intentionally, and it is possible to avoid an influence of remaining current.

In the present embodiment, since the terminal holding member 12 is formed with the pick-up slanting surfaces 28, 28, the terminal member 39 provided on the plug housing 40 is guided by the terminal holding member 12 and smoothly mounted, which makes it easy to mount the service plug 2 to the plug mounting portion 14.

In the present embodiment, since the tilting lever 41 is designed such that it does not fall in the horizontal direction when the service plug 2 is mounted incompletely, the mounting state of the service plug 2 to the plug mounting portion 14 can be judged instantaneously, and it is possible to avoid the incomplete mounting of the service plug 2.

In the present embodiment, the apparatus body 1 is provided with the insulation cover 36 for covering the fuse 7 and the microswitch 15, and the insulation cover 36 is pushed by the cover pushing portion 50 provided on the plug housing 40. Therefore, the insulation cover 36 can not be detached unless the service plug 2 is detached from the plug mounting portion 14 and thus, the safety can be ensured.

In the present embodiment, since the microswitch 15 is used as the conduction detecting means, the mounting space can be small, and the power supply shut-off apparatus can be reduced in both size and cost.

Although the concrete embodiments to which the present invention is applied has been described above, the present invention should not be limited to the above-described embodiments, and various changes can be made.

For example, the bus bar connected to the one fuse terminal 7*a* is defined as the load-side bus bar 3, and the bus bar provided such as to be opposed to the other side edge terminal 8*b* of the intermediate 8 on the opposite side from the load-side bus bar 3 with respect to the insulation wall 11 is defined as the power supply-side bus bar 4, but they may be reversed. That is the bus bar connected to the one fuse terminal 7*a* may be defined as the power supply-side bus bar 4, and the bus bar provided such as to be opposed to the other side edge terminal 8*b* of the intermediate 8 on the opposite side from the load-side bus bar 3 with respect to the insulation wall 11 may be defined as the load-side bus bar 3.

The shapes of the bus bar mounting portions 5, 6, the fuse mounting portion 10, the base 17 and the like are not limited.

What is claimed is:

1. A power supply shut-off apparatus comprising:

an apparatus body including, bus bar mounting portions for respectively mounting one bus bar and another bus bar, a fuse mounting portion for mounting a fuse having one fuse terminal connected to a terminal of the one bus bar and having another fuse terminal connected to a one side edge terminal of an intermediate bus bar, a plug mounting portion which accommodates a terminal holding member in which a terminal of the other bus bar and the other side edge terminal of the intermediate bus bar are disposed on the opposite sides with respect to an insulation wall, and which is formed of a partition wall surrounding an outer periphery of the terminal holding member, and a conduction detecting means mounting portion for mounting conduction detecting means which detects a conduction state in which the one bus bar and the other bus bar are in conduction through the fuse and a nonconduction state therebetween; and a service plug including, a plug housing having a terminal member which is detachably mounted to the plug mounting portion and which is mounted astride the terminal holding member to come contact with the terminal of the other bus bar and to come contact with the terminal of the other side edge of the intermediate bus bar, thereby bringing the one bus bar and the other bus bar into conduction, and a service plug comprising a tilting lever which is tiltable between a substantially vertical state and a substantially horizontal state with respect to the plug housing; wherein when the plug housing is mounted to the plug mounting portion and the tilting lever is tilted down substantially horizontally in a state where the tilting lever of the service plug is held in the substantially vertical state, a projection provided on the tilting lever falls a movable lever of the conduction detecting means so as to allow the conduction detecting means to detect the conduction state between the one bus bar and the other bus bar.

2. A power supply shut-off apparatus according to claim 1, wherein the terminal holding member is formed with a pick-up slanting surface for mounting the terminal member.

3. A power supply shut-off apparatus according to claim 1, wherein the plug housing is provided with a projection which prevents the tilting lever from tilting to the horizontal direction by abutting the tilting lever against an inner surface of the partition wall of the plug mounting portion when the tilting lever is tilted to the horizontal direction in an incomplete mounting state in which the plug housing is not in contact with a tip end surface of the terminal holding member.

4. A power supply shut-off apparatus according to claim 1, wherein the apparatus body is provided with an insulation cover for covering the fuse and the conduction detecting means, and the insulation cover is pushed by a cover pushing portion provided on the plug housing.

5. A power supply shut-off apparatus according to claim 1, wherein the conduction detecting means is a microswitch.

* * * * *